United States Patent
Chepel et al.

(10) Patent No.: US 10,316,690 B2
(45) Date of Patent: Jun. 11, 2019

(54) METHOD FOR VALIDATION OF AN INVESTIGATED SENSOR AND CORRESPONDING MACHINE

(71) Applicant: Siemens Aktiengesellschaft, Munich (DE)

(72) Inventors: Vladislav Chepel, St. Petersburg (RU); Mikhail Kalinkin, St. Petersburg (RU); Alexander Loginov, St. Petersburg (RU)

(73) Assignee: Siemens Aktiengesellschaft, Munich (DE)

( * ) Notice: Subject to any disclaimer, the term of this patent is extended or adjusted under 35 U.S.C. 154(b) by 39 days.

(21) Appl. No.: 15/325,656

(22) PCT Filed: Jul. 16, 2014

(86) PCT No.: PCT/RU2014/000518
§ 371 (c)(1),
(2) Date: Jan. 11, 2017

(87) PCT Pub. No.: WO2016/010446
PCT Pub. Date: Jan. 21, 2016

(65) Prior Publication Data
US 2017/0159486 A1    Jun. 8, 2017

(51) Int. Cl.
*G01D 3/08* (2006.01)
*F01D 21/00* (2006.01)
*F01D 17/20* (2006.01)
*F01D 21/20* (2006.01)

(52) U.S. Cl.
CPC ............ *F01D 21/003* (2013.01); *F01D 17/20* (2013.01); *F01D 21/20* (2013.01); *G01D 3/08* (2013.01); *F05D 2220/32* (2013.01); *F05D 2260/80* (2013.01); *F05D 2260/83* (2013.01); *F05D 2270/71* (2013.01)

(58) Field of Classification Search
CPC ........ F01D 21/003; F01D 21/12; F01D 21/14; F05D 2220/32; F05D 2220/30; G01D 3/08
See application file for complete search history.

(56) References Cited

U.S. PATENT DOCUMENTS

| | | |
|---|---|---|
| 6,356,857 B1 | 3/2002 | Qin et al. |
| 7,346,469 B2 | 3/2008 | Taware et al. |
| 2014/0100816 A1 | 4/2014 | Rogoff et al. |

FOREIGN PATENT DOCUMENTS

| | | |
|---|---|---|
| EP | 1 763 754 | 3/2007 |
| WO | WO 2004/040104 | 5/2004 |

OTHER PUBLICATIONS

Kozionov et al., Wavelet-Based Sensor Validation: Differentiating Abrupt Sensor Faults from System Dynamics, 2011 IEEE, 5 pp.*

* cited by examiner

*Primary Examiner* — Toan M Le
(74) *Attorney, Agent, or Firm* — Cozen O'Connor

(57) ABSTRACT

A method and machine for validating an investigated sensor within a sensor group includes receiving sensor data from sensors of the sensor group measuring the same physical property, calculating a deviation of the sensor data received from the investigated sensor within the sensor group from sensor data reconstructed based on the sensor data received from all other sensors of the sensor group, and signaling a sensor fault of the investigated sensor if the calculated deviation is outside of a trusted range.

16 Claims, 3 Drawing Sheets

METHOD FOR VALIDATION OF AN INVESTIGATED SENSOR AND CORRESPONDING MACHINE

CROSS-REFERENCE TO RELATED APPLICATIONS

This is a U.S. national stage of application No. PCT/RU2014/000518 filed 16 Jul. 2014.

1. FIELD OF THE INVENTION

The invention relates to a method for validating an investigated sensor within a sensor group and, more particularly, to a method for validating an investigated sensor of an industrial turbine.

2. DESCRIPTION OF THE RELATED ART

Complex technical systems, such as industrial turbines, can be outfitted with a plurality of sensors that can generate a high amount of data during testing and/or operation of the respective technical system. A technical system can comprise, for instance, a gas turbine having a large number of sensors working in a harsh environment. High-quality data is needed to provide a correct evaluation of the status of the gas turbine. However, with hundreds of sensors working in extreme conditions, the turbine can typically experience frequent sensor faults that may go on unnoticed and, thus, distort the true picture of the status of the machine or the condition of the machine. Accordingly, an automatic detection of sensor faults is required to correctly identify sensor information. Users or rule-based expert systems built on knowledge derived from human experts are able to validate some sensor signals by inspecting by-passing sensor data received from sensors of the respective technical system. However, these validations have deficiencies, because the underlying vague expert knowledge can usually provide only low-dimensional superficial relationships between the parameters of the technical system. The complexity of measurement systems inside a modern complex technical system, such as an industrial turbine, with a rising number of sensors is steadily increasing.

SUMMARY OF THE INVENTION

In view of the foregoing, it is therefore an object of the invention to provide an automatic fault detection that can cope with a huge number of variables and high frequency dynamic sensor data.

This and other objects and advantages are achieved in accordance with the invention by a method for validating an investigated sensor within a sensor group comprising receiving sensor data from sensors of the sensor group measuring the same physical property, calculating a deviation of the sensor data received from the investigated sensor within the sensor group from sensor data reconstructed based on sensor data received from all other sensors of the sensor group, and signaling a sensor fault of the investigated sensor if the calculated deviation falls outside of a trusted range.

In an embodiment of the method in accordance with the present invention, each sensor within the sensor group is investigated in consecutive order.

In a further embodiment of the method in accordance with the present invention, the investigated sensor is validated using online and/or offline sensor data.

In a further embodiment of the method in accordance with the present invention, the reconstructed sensor data is calculated based on a multiplication matrix M in accordance with the following relationship:

$$\tilde{Y} = X_{i=n} \cdot (M_{i=n, j=n})^{-1} M_{n, i=n},$$

where: M is a N×N multiplication matrix,
N is the number of sensors in the sensor group,
i, j are indices, and
X is the received sensor data.

In a further embodiment of the method in accordance with the present invention, the N×N multiplication matrix M that is utilized is calculated in accordance with the following relationship:

$$M = X^T \times X; M_{n,m} = \Sigma_{i=1}^T X_{t,n} \cdot X_{t,m},$$

where: n, m are indices indicating sensors of the sensor group,
T is a time interval used for sensor data validation, and
t is a time index.

In a further embodiment of the method in accordance with the present invention, the analysis time interval T used for sensor data validation is adapted dynamically depending on the expected group sensor data dynamics of the received sensor data.

In a further embodiment of the method in accordance with the present invention, new available online sensor data that is received during a reception time interval is validated.

In a still further embodiment of the method in accordance with the present invention, the multiplication matrix M is updated for each reception time interval in accordance with the following relationship:

$$M_{k+1} = e^{\frac{T_N}{T_A}} \cdot M_k + (X^T X)_k,$$

where: $T_N$ is the reception time interval,
$T_A$ is the analysis time interval, and
X is the new available online sensor data received during the k-th reception time interval.

In a still further embodiment of the method in accordance with the present invention, the validated new available online sensor data received during the reception time interval $T_N$ is stored as historical sensor data for a storage time interval $T_H$.

In a still further embodiment of the method in accordance with the present invention, the reconstructed sensor data Y is calculated based on a linear combination of the sensor data received from all other sensors of the sensor group such that $$|\tilde{Y} - Y| = \Sigma_{i=1}^T \tilde{Y}_i^2 - Y_i^2 \rightarrow \min,$$

where: Y is the sensor data received from the investigated sensor of the sensor group,
i is an index,
T is a predetermined time interval, and
t is a time index.

It is also an object of the invention to provide a machine having at least one sensor group consisting of sensors adapted to measure the same physical property, where the sensors of the sensor group are monitored by a sensor monitoring unit configured to execute a program comprising instructions performing a method for validating an investigated sensor within the sensor group comprising receiving sensor data from sensors of the sensor group measuring the same physical property, calculating a deviation of the sensor data received from the investigated sensor within the sensor group from sensor data reconstructed on the basis of sensor data received from all other sensors of the sensor group, and signaling a sensor fault of the investigated sensor if the calculated deviation is out of a trusted range. In an embodiment of the machine in accordance with the present invention, the sensor monitoring unit is configured to calculate a deviation of sensor data received from an investigated sensor within the sensor group from sensor data reconstructed based on sensor data received from all other sensors of the same sensor group and is further configured to signal a possible sensor fault of the investigated sensor if the calculated deviation falls outside of a trusted range.

In an embodiment of the machine in accordance with the present invention, the machine comprises an industrial turbine. In a further embodiment of the machine in accordance with the present invention, different physical properties of the industrial turbine are measured by corresponding sensor groups. In a still further embodiment of the machine in accordance with the present invention, the machine is controlled in response to sensor faults signaled by the sensor monitoring unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, different aspects of the present invention are explained in more detail with reference to the enclosed figures, in which.

DETAILED DESCRIPTION OF THE EXEMPLARY EMBODIMENTS

Figure 1:
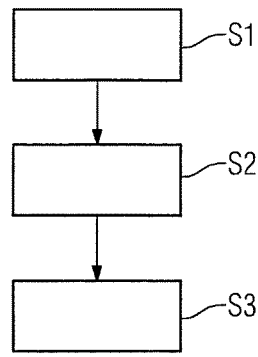
FIG. 1 shows a flow chart for illustrating a possible exemplary embodiment of a method for validating an investigated sensor within a sensor group in accordance with the present invention.

As seen in FIG. 1, the method for validating an investigated sensor within a sensor group in accordance with the present invention can comprise several steps.

In a first step S1, sensor data from sensors of the sensor group measuring the same physical property, such as a temperature, is received for further data processing.

In a second step S2, a deviation of the sensor data received from the investigated sensor within the sensor group from sensor data reconstructed based on sensor data received from all other sensors of the same sensor group is calculated.

In a further step S3, a signal fault of the investigated sensor is signaled if the calculated deviation falls outside of a trusted range.

In an embodiment, each sensor within a sensor group can be investigated in a consecutive order and the investigated sensor can be validated using online and/or offline sensor data.

In a complex technical system such as a turbine, there can be several redundant or well-correlated sensors of a sensor group measuring the same physical property or physical parameter such as a temperature or a pressure. The method in accordance with the present invention can correctly detect sensor faults without confusing them with system dynamics of the investigated technical system. With the method in accordance with the present invention as illustrated in FIG. 1, readings from the group of sensors are monitored dynamically.

In a further embodiment, the sensor data of each sensor in a sensor group is periodically compared with the sensor data of the remaining sensors in the same sensor group. In yet a further embodiment, a linear combination of the sensor data of the remaining sensors in the sensor group is constructed to fit data of the current investigated sensor in a best way. The residual of a fitting procedure is then calculated. If the residual is out of a trusted range, then a sensor error of the investigated sensor is reported.

Within a predetermined time interval, the following procedure can be performed. Each sensor in the group $\{X_{i=1 \ldots N}\}$ in consecutive order is marked as a suspected sensor to be investigated. The group of sensors is divided in two parts or subgroups, i.e., the suspected sensor $Y = X_n$, where n is the index of the investigated suspected sensor, and all other sensors $Z = \{X_{i \neq n}\}$.

The signal of the suspected sensor Y is then reconstructed as a linear combination of the signals or data from the other sensors Z. This reconstructed signal can be labelled $\tilde{Y}$ and constructed i such that a mean square difference between Y and $\tilde{Y}$ becomes minimal:

$$|\tilde{Y} - Y| = \Sigma_{i=1}^{T} \tilde{Y}_i^2 - Y_i^2 \to \min \qquad \text{Eq. (1)}$$

The reconstructed signal that fits the minimum of Eq. (1) can be constructed in two different ways.

Figure 2:
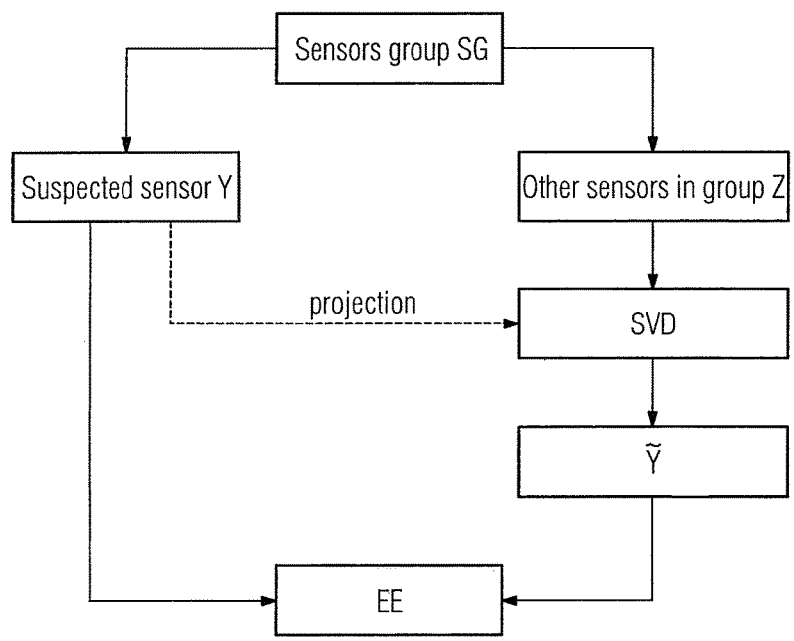
FIG. 2 shows a diagram for illustrating an embodiment of the method for validating an investigated sensor within a sensor group in accordance with the invention.

A first approach for suspected signal reconstruction and validation is illustrated in FIG. 2 showing a sensor group SG of a suspected investigated sensor Y and other sensors Z in the same sensor group SG. A singular value decomposition SVD of a matrix of other sensor data Z can provide three matrices:

U matrix of normalized principal components where columns are orthogonal, size T×(N−1))

S matrix of eigenvalues (positive, diagonal, size (N−1)×(N−1)) and

V rotation matrix to principal components "eigenvectors" (orthogonal, size (N−1)×(N−1)).

These matrices U, S, V are connected to matrix Z with Eq. (2) in accordance with the following relationship:

$$Z \xrightarrow{SVD} U, S, V; Z = U \cdot S \cdot V^T \qquad \text{Eq. (2)}$$

The suspected sensor Y can be then projected to orthonormal basis of principal components U as expressed in Eq. (3).

$$k = U^T \times Y; k_m = Y \cdot U_m = \Sigma_{t=1}^{T} Y_t \cdot U_{t,m}, m = 1 \ldots (N-1) \qquad \text{Eq. (3)}$$

The vector of projections k (size N×1) is now used for reconstruction signal Y as expressed in Eq. (4):

$$\tilde{Y} = U \cdot k \quad \text{Eq. (4)}$$

Consequently, in accordance with Eq. (2) to (4), the vector of the reconstructed signal $\tilde{Y}$ is calculated that is closest with the suspected signal Y. With the reconstructed signal $\tilde{Y}$ and the suspected sensor signal Y, an error estimation EE can be formed as illustrated in FIG. 2. If the error is within a trusted range, there is no fault detection whereas if the error falls outside of the trusted range then a sensor fault is detected.

Figure 3:
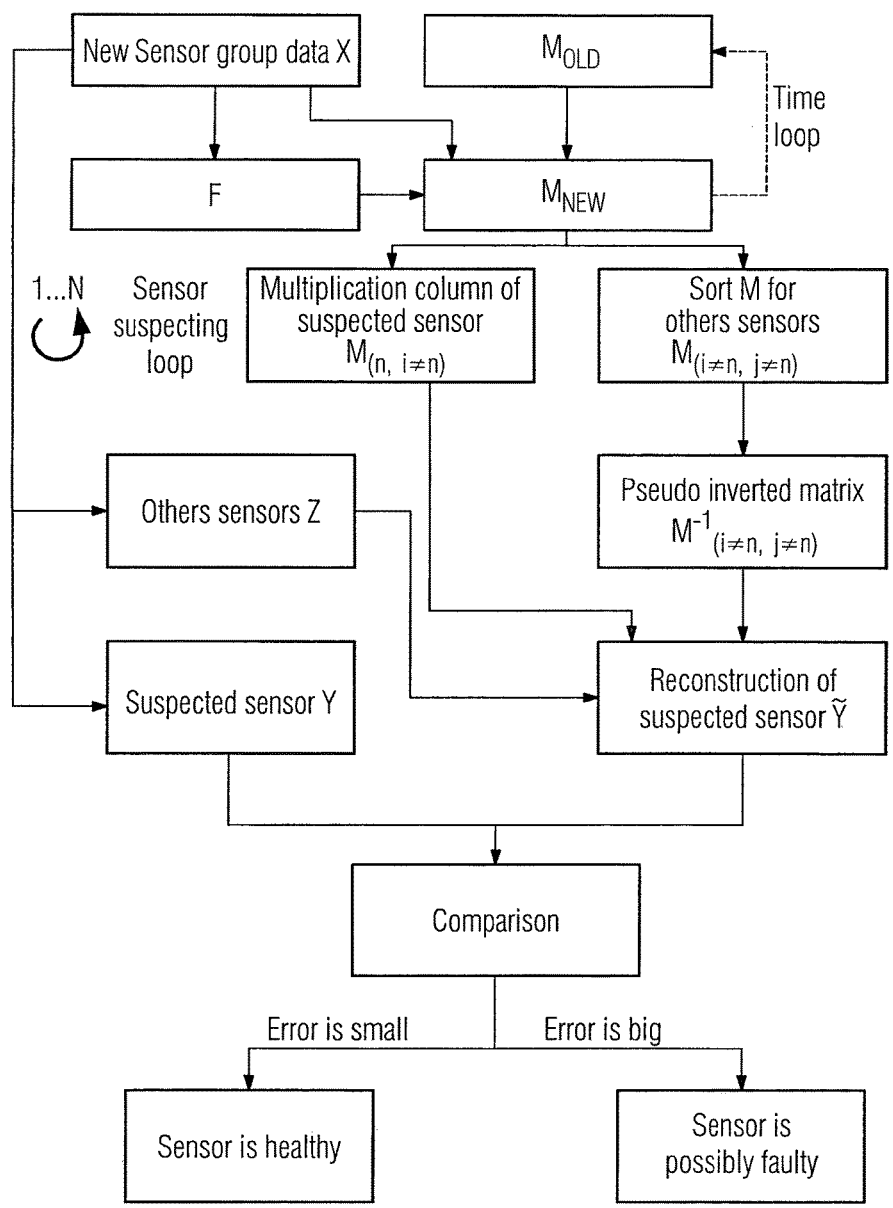
FIG. 3 shows a diagram for illustrating an alternative approach for signal reconstruction and validation in accordance with the invention.

FIG. 3 shows an alternative approach for signal reconstruction and validation. In the presently contemplated embodiment, the sensor reconstruction procedure uses a multiplication matrix M. The reconstructed signal $\tilde{Y}$ is obtained in the presently contemplated embodiment using a multiplication matrix M that is defined by Eq. (5) and has the matrix dimension N×N.

$$M = X^T \times X; M_{n,m} = \Sigma_{i=1}^T X_{t,n} \cdot X_{t,m} \quad \text{Eq. (5)}$$

The reconstructed signal $\tilde{Y}$ for the suspected signal $Y = X_n$ can be constructed in accordance with the following relationship:

$$\tilde{Y} = X_{i \neq n} \cdot (M_{i \neq n, j \neq n})^{-1} M_{n, i \neq n} \quad \text{Eq. (6)}$$

where an inversion matrix $(M_{i \neq n, j \neq n})^{-1}$ indicates a pseudo-inverted matrix. As illustrated in FIG. 3, using a forgetting factor F and the new sensor group data X, a new multiplication matrix $M_{NEW}$ is provided utilizing the previous multiplication matrix $M_{OLD}$ iteratively in a loop. The signal of the suspected sensor is reconstructed by using multiplication column of the suspected sensor $(M_{(n, i \neq n)})$ and by using the pseudo-inverted matrix $M^{-1}$ that has been sorted for other sensors $(M_{i \neq n, j \neq n})$ based on the sensor data of the remaining sensors of the same sensor group as illustrated in FIG. 3. Sensor 1 to N of a sensor group SG can be investigated consecutively in a loop as also illustrated in FIG. 3. The reconstructed sensor signal $\tilde{Y}$ is compared with the sensor data Y of the suspected sensor as shown in FIG. 3. If the calculated error or deviation falls outside of a trusted range, the sensor is classified as possibly faulty, whereas if the error is small, then the sensor is classified as healthy. If the sensor data is stored and a method is applied in an offline mode in accordance with the embodiment of the invention illustrated in FIG. 2 or with the embodiment of the invention illustrated in FIG. 3, then validation results using direct SVD (FIG. 2) or a multiplication matrix M (FIG. 3) are the same. However, if the validation methods illustrated in the embodiments of FIGS. 2, 3 are applied for online sensor data, the results can differ. In an offline mode, a reconstruction method as illustrated in FIG. 2 can be applied for all available data sets. However, sensor data relations can vary with time and a single vector of reconstruction coefficients $\vec{k}$ may not fit the whole available time interval. In this case, the data set can be divided into small sets that are no longer than a time interval $T_L$ of data linearity. Here, however, the time interval $T_L$ should not be too short.

Sensor faults can be divided into fast and slow sensor faults. Fast sensor faults include extreme sensor noise, outliers and abrupt data changes. In contrast, slow sensor faults include sensor signal drift and other disturbances that can be seen only in an enough long observation time interval if applied. An analysis time interval $T_A$ is a time interval for sensor data validation and detection of slowest sensor faults. These time intervals should fulfill $T_A < T_L$ to prevent false alarms.

Figure 4:
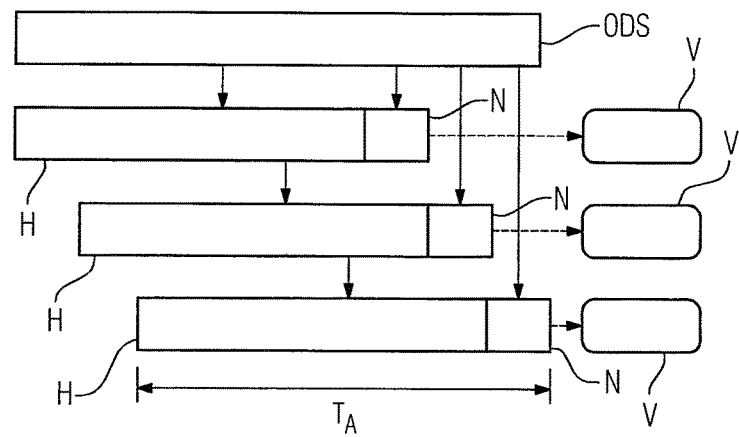
FIG. 4 illustrates the processing of data of an online data stream of the first approach for signal reconstruction and validation illustrated in FIG. 2.

In case of online sensor data validation, new available sensor data can be validated for each new data time interval $T_N$. Usually, this new data time interval $T_N$ lasts for seconds or minutes and is smaller than the analysis time interval $T_A$. Accordingly, a reconstruction method can be applied not only for new not validated data but even also for historical data: $T_A = T_H + T_N$, where $T_H$ is the time interval during which previously validated historical data is temporarily stored. Using the embodiment illustrated in FIG. 2, it is possible to validate the same data set several times as also illustrated in FIG. 4. In FIG. 4, the approach of FIG. 2 is applied for online data processing of an online data stream ODS. The approach illustrated in FIG. 4 uses direct SVD to validate V data sets comprising historical data H and new available data N in an analysis time interval TA.

Figure 5:
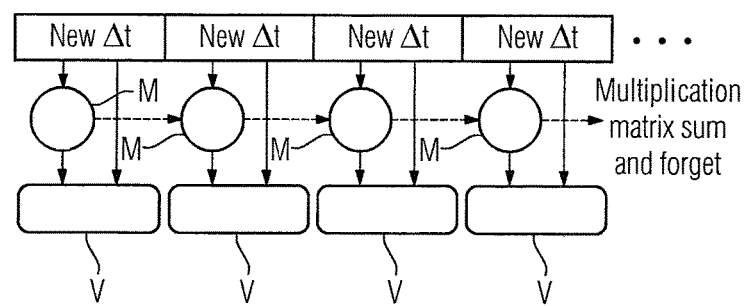
FIG. 5 shows a diagram for illustrating the processing of sensor data of the second approach for signal reconstruction and validation as illustrated in FIG. 3.

The embodiment depicted in FIG. 5 illustrates another alternative approach for online sensor data validation applied via the embodiment illustrated in FIG. 3. In the presently contemplated embodiment, a multiplication matrix M is used. The advantage of the presented embodiment is online validation of sensor data using a multiplication matrix M for data history encapsulation instead of buffering data itself. In another contemplated embodiment, the multiplication matrix M can be dynamically forgotten with time. This helps to encapsulate data dynamics in a certain analysis of time interval $T_A$. If new data in a reception time interval $T_N$ becomes available, then a new updated multiplication matrix $M_{NEW}$ can be calculated from an old multiplication matrix $M_{OLD}$ with equation Eq. (7):

$$M_{NEW} = e^{\frac{T_N}{T_A}} M_{OLD} + (X^T X)_{NEW}, \quad \text{Eq. (7)}$$

where $T_N$ is the reception time interval,
$T_A$ is the analysis time interval and
X is the new available online sensor data received during the reception time interval $T_N$.

In a further contemplated embodiment, the analysis time interval $T_A$ can be dynamically adjusted in accordance with the group data dynamics, i.e., it can be adjusted to be small for fast signal changes and to be big for steady state sensor readings. With the method in accordance with the contemplated embodiments of the invention, it is possible to apply a principle component analysis for sensor validation in an unsupervised manner. The method can also be applied for any technical system that contains sensors working in a harsh environment. With the method in accordance with the embodiment illustrated in FIG. 3, it is possible to encapsulate historical data using a multiplication matrix M for data validation. The method can be performed by a program executed by a processor of a sensor monitoring unit of a machine or complex technical system. In accordance with the presently contemplated embodiment, the sensor monitoring unit is configured to calculate a deviation of sensor data received from an investigated sensor within a sensor group SG from sensor data reconstructed based on sensor data received from all other sensors of the same sensor group SG and is further configured to signal a possible sensor fault of the investigated sensor if the calculated deviation falls outside of a trusted range. The sensor monitoring unit can be integrated in a machine having at least one sensor group SG consisting of sensors adapted to measure the same physical property, where the sensors of the sensor group SG are monitored by the sensor monitoring unit. The sensor monitoring unit can also be connected via a data interface to the monitored sensor groups. The machine can be an industrial turbine, such as a gas turbine, where different physical properties of the industrial turbine are measured by corresponding sensor groups monitored by a sensor monitoring unit configured to execute a program comprising instructions performing the method in accordance with the contemplated embodiments of the present invention. In a still further embodiment, the machine is controlled in response to sensor faults signaled by the sensor monitoring unit.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for validation of an investigated sensor within a sensor group, comprising:
   (a) receiving sensor data from sensors of the sensor group measuring the same physical property;
   (b) calculating a deviation of the sensor data received from the investigated sensor within said sensor group from sensor data reconstructed based on sensor data received from all other sensors of the sensor group; and
   (c) signaling a sensor fault of the investigated sensor and controlling a machine in response to the sensor fault if the calculated deviation is outside of a trusted range;
   wherein the reconstructed sensor data $\tilde{Y}$ is calculated based on a multiplication matrix in accordance with the following relationship:

$$\tilde{Y} = X_{i \neq n} \cdot (M_{i \neq n, j \neq n})^{-1} M_{n, i \neq n},$$

wherein M is an N×N multiplication matrix, N is a number of sensors in the sensor group, i and j are indices, and X is the received sensor data; and
   wherein an analysis time interval utilized for sensor data validation is adapted dynamically depending on expected group sensor data dynamics of the received sensor data.

2. The method according to claim 1, wherein each sensor within the sensor group is investigated in consecutive order.

3. The method according to claim 2, wherein the investigated sensor is validated via at least one of online sensor data and offline sensor data.

4. The method according to claim 1, wherein the investigated sensor is validated via at least one of online sensor data and offline sensor data.

5. The method according to claim 1, wherein the N×N multiplication matrix is calculated in accordance with the following relationship:

$$M = X^T \times X; M_{n,m} = \Sigma_{i=1}^{T} X_{t,n} \cdot X_{t,m},$$

wherein n and m are indices indicating sensors of the sensor group, T is a time interval utilized for sensor data validation and t is a time index.

6. The method according to claim 1, wherein new available online sensor data received during a reception time interval is validated.

7. The method according to claim 6, wherein the N×N multiplication matrix is updated for each reception time interval in accordance with the following relationship:

$$M_{k+1} = e^{\frac{T_N}{T_A}} \cdot M_k + (X^T X)_k,$$

wherein $T_N$ is the reception time interval, $T_A$ is the analysis time interval, and X is the new available online sensor data received during a k-th reception time interval.

8. The method according to claim 7, wherein the validated new available online sensor data received during the reception time interval is stored as historical sensor data for a storage time interval.

9. The method according to claim 6, wherein the validated new available online sensor data received during the reception time interval is stored as historical sensor data for a storage time interval.

10. The method according to claim 1, wherein the reconstructed sensor data $\tilde{Y}$ is calculated based on a linear combination of the sensor data received from all other sensors of said sensor group such that $$|\tilde{Y} - Y| = \Sigma_{i=1}^{T} \tilde{Y}_i^2 - Y_i^2 \to \min,$$

wherein Y is the sensor data received from the investigated sensor of the sensor group, i is an index, T is a predetermined time interval, and t is a time index.

11. A machine comprising:
at least one sensor group consisting of sensors which measure the same physical property; and
a sensor monitor for monitoring the sensors of the at least one sensor group;
wherein the sensor monitor executes a computer program comprising:
   (a) program instructions for receiving sensor data from sensors of the sensor group measuring the same physical property;
   (b) program instructions for calculating a deviation of the sensor data received from the investigated sensor within said sensor group from sensor data reconstructed based on sensor data received from all other sensors of the sensor group; and
   (c) program instructions for signaling a sensor fault of the investigated sensor and controlling the machine in response to the sensor fault if the calculated deviation is outside of a trusted range;
wherein the reconstructed sensor data $\tilde{Y}$ is calculated based on a multiplication matrix in accordance with the following relationship:

$$\tilde{Y} = X_{i \neq n} \cdot (M_{i \neq n, j \neq n})^{-1} M_{n, i \neq n},$$

wherein M is an N×N multiplication matrix, N is a number of sensors in the sensor group, i and j are indices, and X is the received sensor data; and
wherein an analysis time interval utilized for sensor data validation is adapted dynamically depending on expected group sensor data dynamics of the received sensor data.

12. The machine according to claim 11, wherein the sensor monitor is configured to calculate a deviation of sensor data received from an investigated sensor within said sensor group from sensor data reconstructed based on sensor data received from all other sensors of the same sensor group and configured to signal a possible sensor fault of the investigated sensor if the calculated deviation is outside of a trusted range.

13. The machine according to claim 12, wherein the machine comprises an industrial turbine.

14. The machine according to claim 11, wherein the machine comprises an industrial turbine.

15. The machine according to claim 14, wherein different physical properties of the industrial turbine are measured by corresponding sensor groups.

16. The machine according to claim 11, wherein the machine is controlled in response to sensor faults signaled by the sensor monitor.

\* \* \* \* \*